L. G. COPEMAN.
REFRIGERATING APPARATUS.
APPLICATION FILED JAN. 28, 1921.
1,415,922.
Patented May 16, 1922.
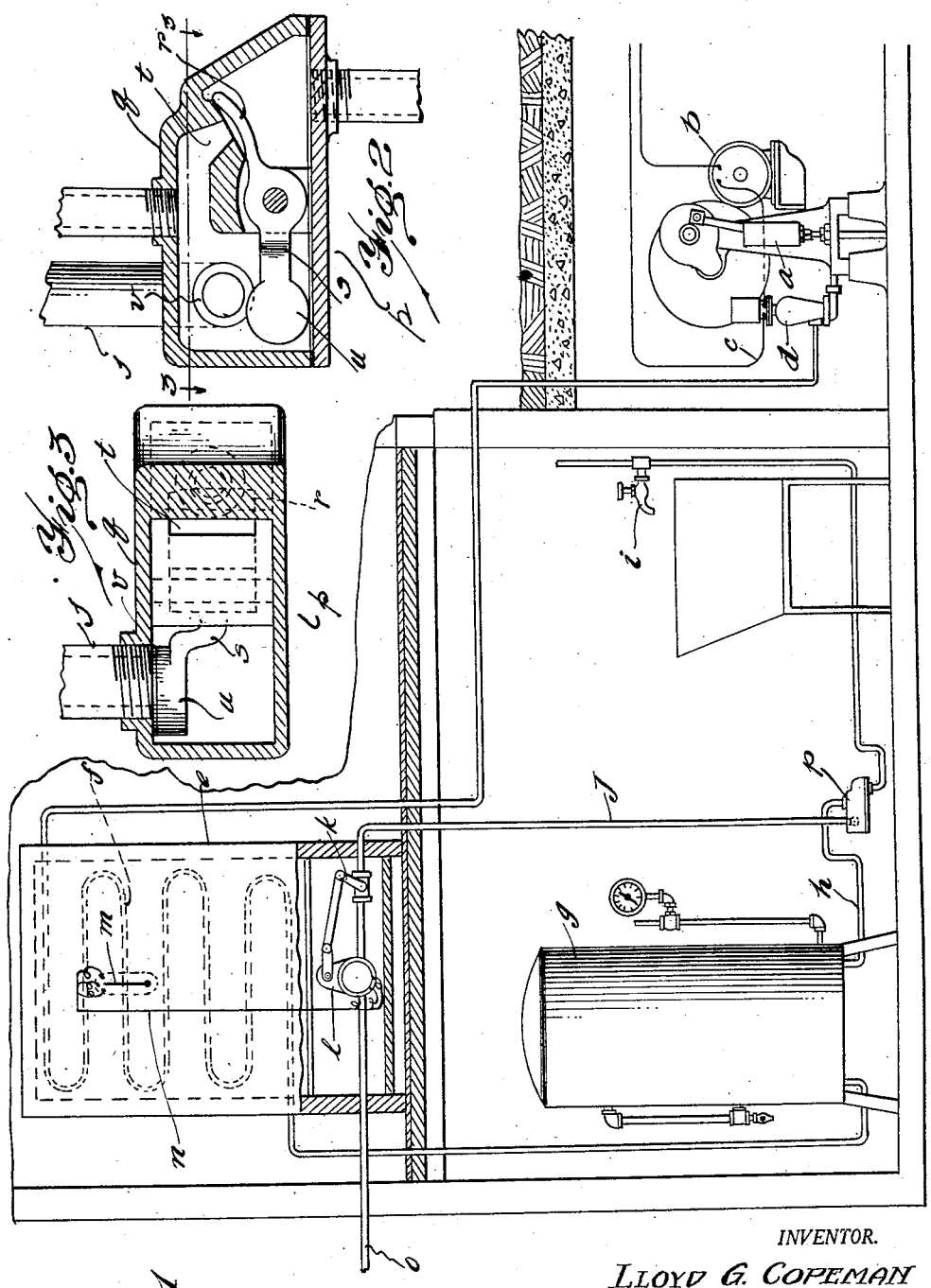
INVENTOR.
LLOYD G. COPEMAN
BY
ATTORNEY.

UNITED STATES PATENT OFFICE.

LLOYD G. COPEMAN, OF FLINT, MICHIGAN, ASSIGNOR TO EDWIN W. ATWOOD, OF FLINT, MICHIGAN.

REFRIGERATING APPARATUS.

1,415,922.  Specification of Letters Patent.  Patented May 16, 1922.

Application filed January 28, 1921. Serial No. 440,636.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to a control device for controlling the wastage in a refrigerating apparatus which uses water circulated therethrough to chill the same. In a prior application I have described in detail my refrigerating apparatus, the main idea of which is to utilize cold water such as found in a well, circulate the same through the refrigerating box and utilize the same source or supply of water for the ordinary service taps about the house or other building.

It is the object of my present invention to so arrange the water line that the water runs first through the refrigerating box and then to the service taps. The gist of the invention is the provision of an automatic control which cuts out the wastage of the water when the water is being drawn through one of the taps or used to re-fill the storage tank.

In the drawings,—

Fig. 1 is a view of the apparatus largely in the nature of a diagrammatic view.

Fig. 2 is an enlarged vertical section of the control valve.

Fig. 3 is a section on the line 3—3 of Fig. 2.

$a$ designates a pump operated by the motor $b$ and which is controlled by the circuit $c$ that is provided with an automatic pressure switch $d$. In my previous application No. 438,593, I have described this method of pump control, which is old construction, and have there given the details of this. In the present application suffice it to say that the pump is operated by the motor $b$ and as long as all the taps are closed and the water is not circulating through the refrigerator, the pressure will accumulate in the pipes to a certain point, say, 60 pounds, which will operate the pressure switch $d$ to open the circuit $c$ and thereby stop the motor.

The refrigerator or refrigerating box is designated $e$ and the coils are designated $f$. These coils are only shown diagrammatically, and in actual practice there would be a great many more of them. The water passes through the coils $f$ down into the storage tank $g$ and from the storage tank the water passes into the service main $h$, where it may be distributed to the various taps such as $i$. $j$ is a branch pipe leading into the bottom of the refrigerator where a valve $k$ operated by a motor control $l$ is opened or closed by the action of the thermostat $m$ and the electrical connections $n$. All this thermostatic and motor control of the valve is depicted and described in detail in my said prior application, hence I simply make reference to it here in a general way as no claim is made to the particular nature of this mechanism, for the invention here claimed is directed to the control device for controlling the wastage of water. For that matter, any other suitable mechanism for opening and closing the valve in obedience to the thermostat could be used.

The operation of the refrigerating apparatus is simple: When the temperature rises to a given point the thermostat opens the valve $k$ through the motor $l$. This starts the water circulating through the coils. The water circulating through the coils absorbs the heat in the box and consequently reduces the temperature in the box. At a given point the thermostat closes the valve and the circulation stops. Now obviously as long as water is being drawn from any of the taps in the service main the circulation through the refrigerator will keep up and it will be simply a wastage of water to allow the water to flow through the branch pipe $j$ and out the outlet $o$. Hence I have provided a control valve $p$ (see Fig. 2) where the same is detailed. This control valve comprises a casing $q$. When water is being drawn through the service main $h$ through the taps, the pressure acts on the foot $r$ of the lever $s$ and causes this to drop down to let water through the orifice $t$ to the tap side of the service main. This raises the disk portion $u$ of the valve and this covers the outlet orifice $v$ of the waste branch $j$. It will, therefore, be evident that when the service taps are being used that the circulation induced by the service taps can be used to cool the refrigerator, avoiding waste through the waste line, if this be open.

As explained in my previous application, the circulation of the water through the box may be used to keep the box up to a predetermined temperature when the same is exposed to the outside atmosphere in the winter. This is possible by simply shifting the wires on the terminals of the thermostat. Obviously my valve for controlling the waste will operate in the same way whether the circulation is used for keeping the box down to a predetermined temperature or up to a predetermined temperature.

What I claim is:

1. In a refrigerating system, the combination of a box, a water line passing therethrough for keeping the temperature within a predetermined range, service taps connected with the water line, a waste line connected with the said water line, and means for automatically cutting out the waste line when one of the service taps is open.

2. In a refrigerating apparatus, the combination of a refrigerator box, a water line passing through the box for keeping the box within a predetermined range of temperature, service taps connected with said water line on the side of the refrigerator box remote from the water source, a waste line connected with said water line on the side of the box remote from the water source, a thermostat affected by the temperature in the said box, a valve operated by the thermostat for controlling the flow through the waste line, and automatic means for cutting out the flow through the waste line when one or more of the service taps are open.

3. In a refrigerating apparatus, the combination of a refrigerating box, a water line passing through the box for keeping the temperature of the box within a predetermined range, service taps connected with the said water line on the side of the refrigerator remote from the source, a waste line for conveying away the water circulated through the refrigerator, said waste line connected with the water line on the side of the refrigerator remote from the source, and an automatic valve at the juncture between the waste line and the water line operated by flow of water on through the water line for cutting out the waste line when water is discharging through one or more of the taps.

4. In a refrigerating apparatus, the combination of a refrigerating box, a water line passing through the box for keeping the temperature of the box within a given range, one or more taps connected with the water line, a waste line connected with the water line after the same has passed through the refrigerator, and an automatic control for the waste line at the juncture of the waste line and the main line, comprising a casing, a lever-like valve adapted to be swung by the water passing through the casing and discharging through the taps and including a portion that when so swung covers up the discharge opening into the waste line.

5. In a refrigerating apparatus, the combination of a refrigerating box, a water line passing through the box and arranged to keep the box within a given range of temperature, taps connected to the water line after the same has passed through the refrigerator, a waste line provided with a suitable control and connected with the water line after the same has passed through the refrigerator, and an automatic control for the waste line located at the juncture of the waste line and the main line and including a casing provided with an orifice $t$ leading to the taps, a lever-like valve $s$ having a foot $r$ adapted to be moved by the water passing through the orifice $t$ when one of the taps is open and provided with a disk-like closure $p$ adapted to cover the orifice $t$ leading out the waste line.

In testimony whereof I affix my signature.

LLOYD G. COPEMAN.